US009387555B2

(12) United States Patent
Koch et al.

(10) Patent No.: US 9,387,555 B2
(45) Date of Patent: Jul. 12, 2016

(54) METHOD AND APPARATUS FOR MACHINING A WORKPIECE BY MEANS OF A LASER BEAM

(71) Applicants: Martin Koch, Neukirchen-Vluyn (DE); Stefan Wischmann, Berlin (DE); Erwin Blumensaat, Dortmund (DE)

(72) Inventors: Martin Koch, Neukirchen-Vluyn (DE); Stefan Wischmann, Berlin (DE); Erwin Blumensaat, Dortmund (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 471 days.

(21) Appl. No.: 14/038,348

(22) Filed: Sep. 26, 2013

(65) Prior Publication Data
US 2014/0021177 A1  Jan. 23, 2014

Related U.S. Application Data

(63) Continuation of application No. PCT/EP2012/055213, filed on Mar. 23, 2012.

(30) Foreign Application Priority Data

Mar. 31, 2011 (DE) .......................... 10 2011 001 710

(51) Int. Cl.
*B23K 26/04* (2014.01)
*B23K 26/36* (2014.01)
*B23K 26/38* (2014.01)

(52) U.S. Cl.
CPC ............... *B23K 26/365* (2013.01); *B23K 26/04* (2013.01); *B23K 26/082* (2015.10); *B23K 26/0821* (2015.10); *B23K 26/36* (2013.01); *B23K 26/362* (2013.01); *B23K 26/38* (2013.01); *B23K 2201/006* (2013.01)

(58) Field of Classification Search
CPC ......... B23K 26/04; B23K 26/36; B23K 26/38
USPC ............. 219/121.67–121.69, 121.72, 121.78, 219/121.79; 700/166; 706/900, 904
See application file for complete search history.

(56) References Cited

U.S. PATENT DOCUMENTS

| 5,517,420 | A | 5/1996 | Kinsman et al. | |
| 6,355,908 | B1 * | 3/2002 | Tatah | B23K 26/0624 219/121.81 |
| 6,885,000 | B1 * | 4/2005 | Adler | G01N 23/22 250/307 |

(Continued)

FOREIGN PATENT DOCUMENTS

| DE | 10060407 A1 | 6/2002 |
| DE | 10261667 A1 | 7/2004 |

(Continued)

*Primary Examiner* — Samuel M Heinrich
(74) *Attorney, Agent, or Firm* — Reinhart Boerner Van Deuren P.C.

(57) ABSTRACT

The invention relates to a method for machining a workpiece by means of a laser beam, in particular a part of a motor vehicle, wherein a laser beam is applied to the workpiece by means of a scanner, material of the workpiece is ablated, the radiation produced by the plasma during the process in the work area and/or reflected laser radiation is detected, and a signal is generated depending on the detected plasma and/or laser radiation. In addition the invention also relates to an apparatus for the laser beam machining of a workpiece, in particular for carrying out a method according to the invention. A greater process reliability can be ensured in laser beam machining in that the position of the laser beam in relation to the workpiece and/or the ablation depth is regulated and/or controlled depending on the signal.

9 Claims, 2 Drawing Sheets

(56) References Cited

U.S. PATENT DOCUMENTS

2002/0190435 A1  12/2002  O'Brien et al.
2007/0296966 A1  12/2007  Benicewicz et al.
2008/0078752 A1* 4/2008  Bischoff ................ A61F 9/008
                                                219/121.72

FOREIGN PATENT DOCUMENTS

| | | |
|---|---|---|
| DE | 10305876 A1 | 8/2004 |
| DE | 102006052824 B4 | 5/2009 |
| EP | 1591188 A1 | 11/2005 |
| WO | WO 02/38323 A1 | 5/2002 |

* cited by examiner

METHOD AND APPARATUS FOR MACHINING A WORKPIECE BY MEANS OF A LASER BEAM

CROSS-REFERENCE TO RELATED PATENT APPLICATIONS

This patent application is a continuation of PCT/EP2012/055213, filed Mar. 23, 2012, which claims priority to German Application No. 102011001710.0, filed Mar. 31, 2011, the entire teachings and disclosure of which are incorporated herein by reference thereto.

FIELD OF THE INVENTION

The invention relates to a method for machining a workpiece, in particular a component of a motor vehicle, wherein a laser beam is applied to the workpiece by means of a scanner, material of the workpiece is ablated, the radiation produced by the plasma in the work area during the process and/or reflected laser radiation is detected, and a signal is generated depending on the detected plasma radiation and/or laser radiation. In addition the invention also relates to an apparatus for machining a workpiece by means of a laser beam, in particular for carrying out a method according to the invention.

BACKGROUND OF THE INVENTION

Machining by means of a laser beam has become increasingly established as an alternative to conventional mechanical processes for machining materials, for example steel, such as milling, cutting or punching. The machining of workpieces by means of laser beams has many advantages. On the one hand ablation and wear of the tool can be completely avoided, since the energy of the laser beam is fully absorbed into the workpiece and no tool that is subject to wear has to be used. Accordingly, also workpieces that on account of their hardness or brittleness cannot be mechanically machined at all or only with a great deal of effort, can be efficiently machined. On the other hand by using the laser beam and specifying a contour that the laser beam has to follow, virtually any arbitrarily complex or fine structures can be projected onto the workpiece, which can then be ablated, cut to size or welded. Especially in the steel-processing or automobile industry sectors very hard materials often have to be fashioned into relatively complex shapes.

Thus, for example, in printed specification DE 10 2006 052 824 B4 a method is known for the laser beam cutting of a metallic component, in which the laser beam is moved in an oscillating manner during the tracing of the cutting contour. Detection of the radiation produced by the plasma and/or the reflected laser radiation does not take place, however.

From printed specification DE 102 61 667 A1 on the other hand a method and an apparatus for laser cutting are known, in which the plasma is continuously monitored and the result is related to the quality of the cutting procedure. If the quality of the workpiece is not satisfactory, the workpiece is rejected.

The result of the machining process can be influenced by a number of parameters. These parameters are for example the material of the workpiece, the energy introduced into the workpiece by the laser beam, the wavelength of the laser radiation or the focal length of the focused laser radiation. These factors are often determined beforehand by appropriate tests.

With conventional laser machining tools the speed of the process is mainly limited by the achievable speed of the positioning systems at which a contour-true machining is still possible, and in these cases speeds of 5-10 m/min can be achieved. At higher speeds either fine contours can no longer be followed or the positioning accuracy is too low. In addition, the process speed is also limited by the achievable intensities of the laser radiation, since at low intensities the contour has to be traced correspondingly slowly or repeatedly.

In order to obviate these disadvantages high-performance scanners were combined with high-output lasers. By using high-performance scanners a very fast beam deflection can take place, wherein at the same time high intensities of the laser radiation can be achieved by using high-output lasers.

With sufficiently high intensities it is possible that the material of the workpiece does not melt as usual and has to be expelled by a process gas, but instead sublimes almost completely, or melt that is possibly formed is also expelled sufficiently by the resultant vapour pressure without having to use process gas.

In order to permit the necessary intensities of the laser radiation, as a rule the radiation is focused by optical components so that the focal point is located on the surface or in the vicinity of the workpiece. High intensities are also achieved by an appropriately strong focussing of the laser beam. This has the result, however, that the diameter of the laser beam (the spot) has a correspondingly small extension in the work or focal area perpendicular to the axis of the laser beam. On the one hand with small spot diameters correspondingly finer contours can be traced on the workpiece. On the other hand the use of small spot diameters also brings disadvantages, however, in relation to the quality of the machining result. Thus, increased demands have to be placed on the positioning of the laser beam and therefore of the spot, whose diameter is in the region of 0.1 mm. If additional positioning systems are used apart from the scanner, an exact positioning can no longer be ensured. On account of the small spot diameter it may also happen that molten material will reoccupy already ablated regions. A cutting kerf for example can then close again.

SUMMARY OF THE INVENTION

On the basis of the above the object of the invention is to provide a method and an apparatus with which a greater process reliability can be ensured in laser beam machining.

According to a first teaching of the present invention the above identified object is achieved according to the method in that the position of the laser beam in relation to the workpiece and/or the ablation depth is regulated and/or controlled depending on the signal.

It has been found that when using a scanner for machining material by means of a laser beam, the signal that is produced depending on the radiation produced by the plasma in the machining process and/or the reflected laser radiation can be used to regulate or control the machining process. It can for example be ensured in a simple manner that the position and/or ablation depth of the laser beam is in a narrow tolerance range in relation to the predetermined contour and/or depth. For example the intensity, the spectral composition of the detected signal and/or the change over time of the signal can provide information on the actual positions and/or ablation depth. A change in the position of the laser beam in relation to the workpiece is understood to mean a change of the position on the workpiece and/or a change of the focus position for example by a dynamic change of the focal length. The ablation depth is basically understood to mean the depth of the ablation perpendicular to the material surface due to the removal of material. Preferably, in addition the further course of the processing is influenced through the generated signal, in that parameters such as the position of the laser beam, the power of the laser radiation, the speed of the laser beam and/or the number of ablation cycles are influenced. In this way for example inaccuracies in the movement of the component to be machined caused by further positioning systems, which would otherwise lead to a machining no longer true to the contour, can be compensated. If the machining is carried out in several ablation cycles a correction of the positioning can be carried out afterwards in the next ablation cycle. The ablation depth can for example be changed by varying the speed of the tracing of the contour with the laser, the laser power or the number of ablation cycles.

In an advantageous modification of the method according to the invention the material of the workpiece is ablated by machining by means of the laser beam or the workpiece is cut. If the intensity of the laser radiation in the work area is sufficiently high, the material to be ablated can be melted. It is, however, particularly advantageous if the intensity is sufficient to sublime directly into large pieces the material of the workpiece to be ablated. The complication of having to expel the melt from the ablated region is thereby avoided. Mechanical processes such as punching or engraving through a contactless method can be replaced by the ablation of the material. If the ablation process is carried out either with sufficiently frequent repetitions of the ablation or with a sufficiently high output, the workpiece can locally also be completely severed. In this connection the workpiece can be cut and excess material in the edge region for example can be removed, and also holes, slits, bores or other contours can be made in the workpiece.

It has proved particularly advantageous if the position of the laser beam in relation to the workpiece is altered perpendicularly to the scanning direction depending on the signal. The scanning direction is basically understood to mean the direction in which the spot momentarily moves on the workpiece. In the case of a straight contour, for example a straight cutting kerf, this direction is constant during the tracing of the contour. Curvilinear or interrupted contours can, however, also be traced. With small spot diameters the exact positioning of the laser beam is particularly important in order to be able to trace the predetermined contour. If the spot has to be positioned for example in an already existing depression or cutting kerf whose width is of the size of the spot diameter, or if the spot has to follow a contour along an edge that as far as possible should not be worked by the laser beam, i. e. that for example should not be melted, then in particular a positioning that as far as possible is accurate perpendicular to the scanning direction is important. In this connection it is particularly advantageous if the position of the laser beam in relation to the workpiece perpendicular to the scanning direction is altered depending on the intensity of the signal, since the intensity can change with the position of the spot on the workpiece.

According to a further modified embodiment of the method according to the invention the process is carried out in a plurality of ablation cycles, in particular depending on the material thickness. An ablation cycle is basically understood to mean the tracing of a predetermined contour by the laser beam. This can be repeated as necessary. The contours can, but, however, do not have to be, identical. For example the contour of an ablation cycle can also correspond only partly to the previous cycles. Also other parameters, such as the speed of the tracing of the contour or the laser output, can vary in the plurality of ablation cycles or also within one ablation cycle. In this way, in the case of ablation or cutting also workpieces can be machined in which more material has to be ablated or the material ablation process is inefficient.

If an ablation cycle, in particular the last ablation cycle, is repeated or partly repeated depending on the signal generated by the detection of the radiation of the plasma and/or the reflected laser radiation, it can be ensured that a desired machining result is achieved. On account of irregularities in the workpiece or unavoidable irregularities of the machining process a previously specified number of ablation cycles for example may not be sufficient. If for example the workpiece is to be completely cut through or ablated to a specific material layer, the progress of the ablation process can be monitored with the aid of the intensity or spectral composition of the signal. If a further material ablation is necessary in individual regions of the contour, for example a curved portion, or over the whole contour, the ablation cycle is correspondingly repeated as often as necessary until the desired result or the desired ablation depth or cutting depth is achieved.

It is particularly advantageous if the radiation is detected by at least one detector comprising an optoelectronic and/or spectroscopic and/or pyroelectronic element. Such detectors are readily available on the market, are cheap to purchase and are simple to handle. The optoelectronic, spectroscopic or pyroelectronic detection enables the signal to be generated from the radiation in the work area. The radiation of the plasma as well as reflected laser radiation can be detected in order to generate the signal. These radiations differ as a rule as regards their wavelengths. By means of optical filters or a wavelength-dependent detection it can be established which wavelengths should be used to generate the signal. These detectors detect the radiation also with a sufficient speed in order to follow the machining process and allow a control and/or regulation of the process.

According to a further advantageous modification of the method according to the invention the axis of the observation radiation path in the work area forms an angle with the axis of the laser beam. The axis of the observation radiation path is basically understood to mean the straight line that joins the detected radiation source in the work area and the detector. By means of this angle it is ensured that the intensity of the signal alters depending on the positioning of the laser beam in relation to a depression or cutting kerf or depending on the progress of the ablation or cutting process. Whereas much of the radiation produced by the plasma or reflected laser radiation can be detected on the surface of the workpiece, the detectable radiation is blocked if the spot is located within depressions or cutting kerfs. With a coaxial arrangement of the detector, if the axis of the observation radiation path and the laser beam axis coincide, this intensity difference is not or is only slightly manifested. If the workpiece is completely cut through, a reduction of the intensity of the signal is also recorded since the laser beam no longer, or only slightly, interacts with the workpiece in the edge region of the complete cut.

Preferably, the radiation is detected by at least one detector arranged outside the cutting plane. The cutting plane is basically understood to mean the plane that is encompassed by the cutting kerf, in which therefore the laser beam moves in the work area. In this way it happens that the intensity of the signal depends on the positioning of the laser beam in relation to a depression or cutting kerf or on the progress of the ablation or cutting process.

It is particularly advantageous if the radiation is detected by at least two detectors arranged on both sides of the cutting plane. In this way the radiation produced by the plasma and/or the reflected laser radiation can be detected on both sides of the cutting kerf. In this way it is possible for example to achieve a more accurate correlation between the position of the laser beam in relation to the cutting kerf and the signal of the detectors. This arrangement simplifies the machining process particularly in relation to a correction of the position of the laser beam perpendicular to the scanning direction.

According to a further embodiment of the method according to the invention the laser beam machining is carried out in the form of remote cutting. Remote cutting is understood to mean a method of laser beam machining in which lasers with high outputs and scanners with very fast beam deflections are used. The material is in this connection almost completely vaporised or at least partly expelled by the resultant vapour pressure. In this way, additional process gas for example can be dispensed with.

Preferably, a spot diameter of the laser beam of 10 to 500 μm, preferably 50 to 100 μm, is used. The focusing of the laser beam can be achieved by corresponding optical elements such as lenses or mirrors. A very small spot diameter leads to a correspondingly high intensity of the radiation in the work area. In conjunction with the method according to the invention the machining accuracy with these very small spot diameters is significantly improved.

In an advantageous modification of the method according to the invention the workpiece is indirectly or directly hot formed before the laser beam machining. Direct hot forming is a one-stage process in which workpieces of high-strength steels, for example manganese-boron steels are heated and formed at temperatures above the AC3 temperature. The hot forming enables high-strength workpieces to be formed inexpensively. Indirect hot forming is a two-stage process, in which the hot forming takes place before a cold forming. In this way greater complexities of the components can be achieved. Indirect hot forming is, however, more complicated and cost-intensive than direct hot forming. The workpiece is optionally press-hardened in the same or in an additional work step. Particularly high strengths, for example tensile strengths of more than 1400 MPa, can be achieved by press-hardening. High-strength materials enable an optimal crash behaviour of car body parts to be achieved. However, mechanical machining procedures on the high-strength workpieces are particularly subject to wear, which means that the laser machining according to the teaching of the invention is particularly advantageous. With the aid of the method according to the invention also press-hardened workpieces, for example components of a vehicle body, can in fact be machined almost free of wear.

Preferably, the workpiece consists of steel, preferably of a manganese-boron steel. Manganese-boron steels, such as for example 22MnB5 or MBW 1500, are extremely strong and have good forming properties. By heating and rapid cooling the minimum tensile strength of the workpiece of 500 MPa in the as-supplied state can be raised to 1650 MPa. Manganese-boron steels are preferably directly hot formed. The workpiece can also consist of micro-alloyed steels such as MHZ steel. With all higher strength steels the method according to the invention offers advantages in relation to a virtually wear-free machining of workpieces.

Optionally, the workpieces can also be provided with a hot-dip aluminised surface finish. This coating offers a good protection against the scale formation that typically occurs in hot forming, and provides for an improved service life of the hot forming tools. Other or additional coatings are also possible, for example coatings that effectively prevent scale formation and at the same time support by means of additives the cold and/or hot forming. Such coatings have only a slight influence on the interaction between the laser radiation and workpiece, so that coated workpieces can be machined using the method according to the invention.

The workpieces preferably have a thickness of 0.5 to 3 mm, preferably 1 to 2 mm, and in particular 1.2 mm to 1.8 mm. A mechanical machining of workpieces of this thickness, in particular workpieces of this thickness produced from high-strength steels, is particularly problematic on account of the wear of the tools and the required force that has to be applied. The method according to the invention allows in this case a significant simplification, since a mechanical machining can be omitted.

If the workpiece and scanner are moved at least intermittently relative to one another, this has the advantage that the initially restricted area of the scanning field can thereby be enlarged. The optics of a scanner are as a rule designed to cover only a relatively restricted scanning field of for example 100 mm×100 mm. By a movement of the scanner and/or workpiece larger workpieces can then be machined. It is thus possible to subject car body parts, such as for example a B pillar, to a particularly precise laser beam machining.

If the laser beam is in addition deflected via a polygonal mirror an even larger freedom in the movement of the laser beam can be achieved and more complex laser beam machining procedures can be carried out, in particular at higher machining speeds.

Finally, the method according to the invention is particularly suitable for machining car body parts such as A, B, C or D pillars, crashboxes, tunnels or longitudinal members. The aforementioned components in particular often have to have a very high hardness, which means that machining by means of a laser beam is suitable. The components often also have an extremely complex shape, so that the use of complex machining tools can be avoided when employing the method according to the invention. Also, the accuracy of machining for example bores, cut-to-size sections or cut-out parts can be improved.

According to a second teaching of the present invention the aforementioned object can be achieved with an apparatus for the laser beam machining of a workpiece, in particular a component of a vehicle, having at least one means for producing a laser beam, at least one scanner, at least one detector for detecting the radiation produced by the plasma and/or the reflected laser radiation, and means for generating a signal from the detected radiation, in that means are provided with which the position of the laser beam in relation to the workpiece and/or the ablation depth can be regulated and/or controlled depending on the signal. One of the aforementioned methods in particular can be carried out with this apparatus. The regulating and/or control means can for example be a computer and corresponding software, which can process the signals of the detectors and can control the scanner and/or additional positioning systems and/or the laser. In this way a regulating circuit can be constructed that can use the detected signal in order to regulate the machining process.

It is particularly advantageous if the apparatus comprises at least two detectors arranged on both sides of the cutting plane. In this way the radiation produced by the plasma and/or the reflected laser radiation can be detected on both sides of the cutting kerf. It is thereby possible for example to achieve a more accurate association between the position of the laser beam in relation to the cutting kerf and the signal from the detectors. This arrangement simplifies the method particularly as regards a correction of the position of the laser beam perpendicular to the scanning direction.

Preferably the at least one detector is arranged on the side of the workpiece corresponding to the incidence side of the laser beam. During the machining process the radiation produced by the plasma and/or the laser radiation should be detected almost exclusively on this side, and accordingly such an arrangement is advantageous. Only after or shortly before the workpiece has been completely cut can the radiation produced by the plasma and/or the laser radiation also be detected on the side of the workpiece facing away from the incidence side. An arrangement on the side facing away from the incidence side is convenient if the machining process simply has to be optimised with regard to a complete cutting of the workpiece.

For further modifications and advantages of the apparatus according to the invention reference is made on the one hand to the claims and on the other hand to the description of the method according to the invention.

BRIEF DESCRIPTION OF THE DRAWINGS

The invention will now be described in more detail hereinafter with exemplary embodiments in conjunction with the drawings, in which.

DETAILED DESCRIPTION OF THE INVENTION

Figure 1:
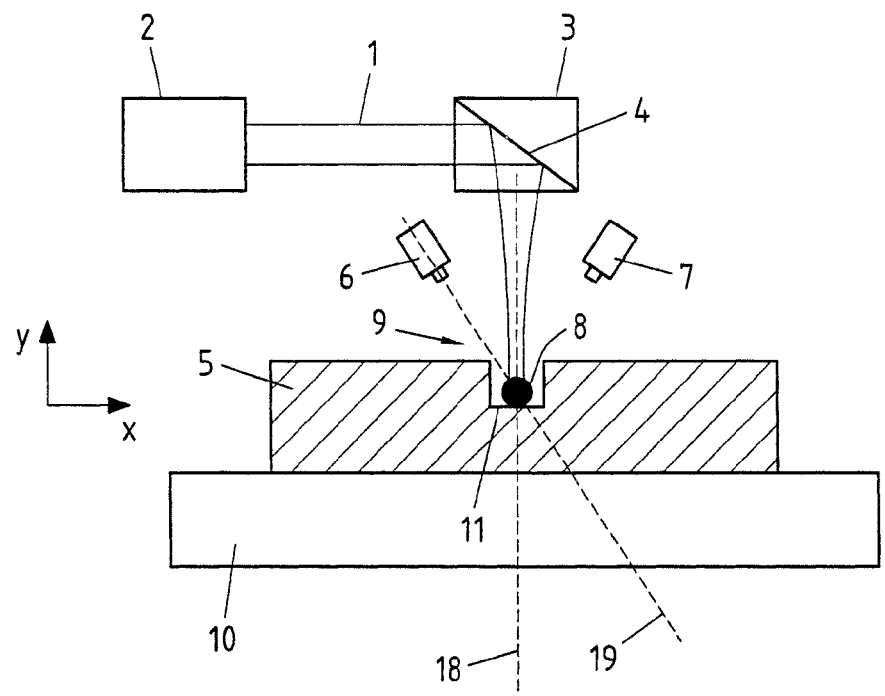
FIG. 1 shows in a cross-sectional view an exemplary embodiment of an apparatus according to the invention for carrying out the method according to the invention.

FIG. 1 shows in a cross-sectional view an exemplary embodiment of an apparatus according to the invention for carrying out the method according to the invention. The laser beam 1 is generated in a laser beam source 2 and is deflected by means of a scanner 3 and deflecting mirror 4 onto the workpiece 5. The scanning direction and cutting kerf extend in FIG. 1 perpendicularly to the cross-sectional surface and image plane. Radiation produced by the plasma 8 and/or reflected laser radiation can be detected by means of a first, left-hand detector 6 and a second, right-hand detector 7. The axis of the observation radiation path 19 encloses an angle with the laser radiation axis 18. More than two detectors or also only a single detector can, however, also be provided. The laser beam 1 is incident in the work area 9 substantially perpendicular to the workpiece 5. The workpiece 5 can be moved by means of further positioning systems 10 relative to the scanner 3. The material ablation effects a continuation of the cutting kerf 11 in the Y direction.

Figure 2:
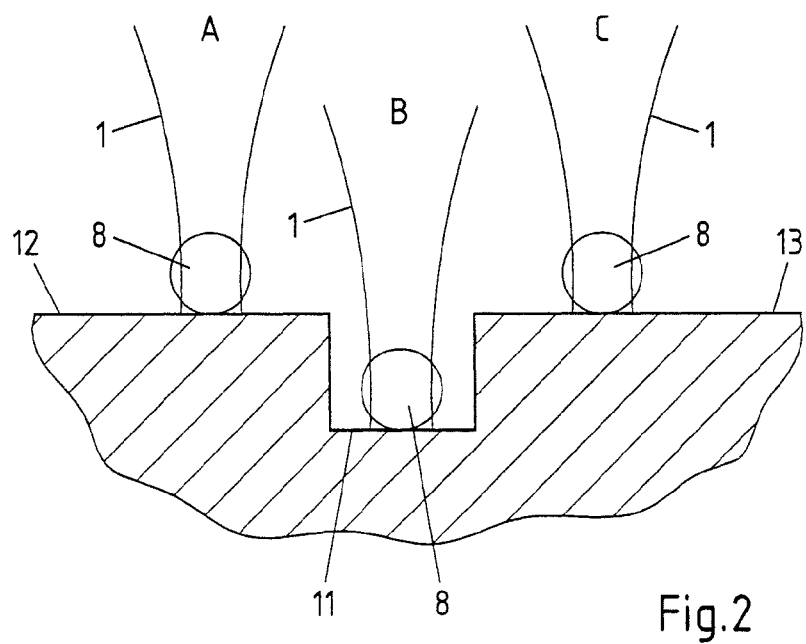
FIG. 2 is an enlarged schematic view of the work area of the laser beam from FIG. 1 with three possible positions of the laser beam.

FIG. 2 shows an enlarged view of the work area with three possible positions A, B and C of the laser beam 1. In the position A the laser beam 1 is positioned on the left-hand edge 12 of the cutting kerf 11, while in the position C the laser beam 1 is positioned on the right-hand edge 13 of the cutting kerf 11. In the position B the laser beam 1 is positioned in the cutting kerf 11. A different intensity is detected by the detectors 6, 7 depending on the position of the laser beam 1. When machining multi-layer materials a different wavelength is also detected by the detectors 6, 7 if in the position B a different material is machined by the ablation than in the positions A and C. Different properties of the detected radiation can thus be used for the method according to the invention.

Thus, FIG. 3 shows schematically the value of the intensity of the signal of the first, left-hand detector 6 on the Y-axis depending on the position of the laser beam 1 on the X-axis. If the laser beam 1 is in the position A, the signal detected by the first, left-hand detector 6 is the largest, whereas if the laser beam 1 is in the position B, i. e. within the cutting kerf 11, the detected signal is the smallest. In the position C the laser beam 1 is, as in the position A, also outside the cutting kerf 11, although it is further from the first, left-handed detector 6 and in a position that produces a smaller signal at the first, left-handed detector 6 compared to the position A.

Figure 3A:
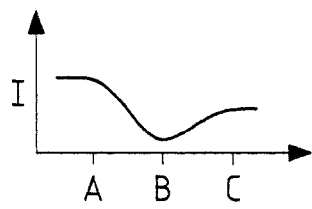
FIGS. 3a-d show the intensities of the signal depending on the position of the laser beam and on the progress of the ablation.
Figure 3B:
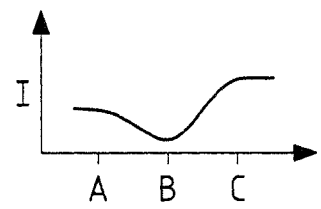

FIG. 3b shows schematically corresponding to this the value of the intensity of the signal of the second, right-handed detector 7 on the Y-axis depending on the position of the laser beam 1 on the X-axis. If the laser beam 1 is in the position C, the signal detected by the second, right-handed detector 7 is the largest, whereas if the laser beam 1 is in the position B, i. e. within the cutting kerf 11, the detected signal is the smallest. In the position A the laser beam 1 is, as in the position C, also outside the cutting kerf 11, though further from the second, right-handed detector 7 and in a position that produces a smaller signal at the second, right-handed detector 7 compared to the position C.

Figure 3C:
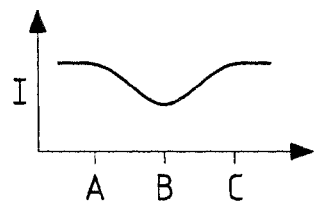

FIG. 3c now shows schematically a super-positioning of the two signals from FIGS. 3a and 3b. It can clearly be seen that the optimal position B of the laser beam 1 is located in the region of the local minimum of the intensity function. By means of a regulating circuit the scanner 3 can be controlled during the machining so that the intensity remains a minimum and consequently the laser beam 1 can be held in the cutting kerf 11.

Figure 3D:
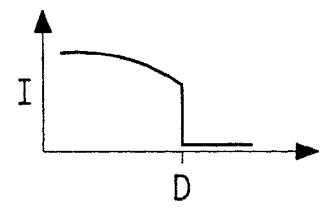

FIG. 3d now shows schematically on the Y-axis the pattern of the intensity that is recorded by one of the detectors 6, 7 while a workpiece 5 is being completely cut. The depth of the cutting kerf and the cutting point D are plotted on the X-axis. If material is ablated in the cutting kerf 11, then increasingly less radiation is detected by the detectors 6, 7 with increasing depth of the cutting kerf 11. If the workpiece 5 is locally completely cut all the way through, the intensity of the signal significantly falls at point D, since no or only a small amount of radiation produced by the plasma 8 and/or reflected laser radiation leaves the work area 9 and the laser beam 1 can pass almost unhindered through the workpiece 5. Thus, depending on the position of the laser beam 1 it can be established whether the workpiece 5 has been completely cut, and if necessary individual steps of the ablation process can be repeated.

Figure 4:
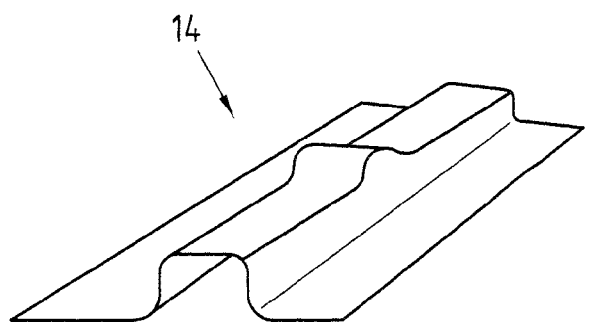
FIG. 4 shows a schematic and a perspective view of a finished tunnel that can be machined using the method according to the invention.
Figure 5:
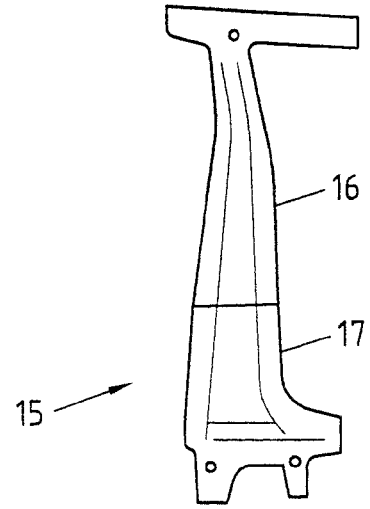
FIG. 5 shows a B pillar produced by the method according to the invention.

FIGS. 4 and 5 show workpieces 5 that can be machined with the method according to the invention and/or with the apparatus according to the invention. FIG. 4 shows a finished tunnel 14. This can be produced for example from manganese-boron steel and can be fabricated by means of indirect hot forming. FIG. 5 shows a B pillar 15. This can be composed of two parts 16, 17 and can be produced for example from hot-dip aluminised manganese-boron steel and hot-dip aluminised micro-alloyed steel, for example MHZ steel. A material ablation, in particular bores and cuts, can be carried out particularly accurately and efficiently on these materials using the method according to the invention.

The invention claimed is:

1. Method for machining a workpiece by means of a laser beam, in particular a component of a motor vehicle, comprising applying a laser beam is to the workpiece by means of a scanner, wherein material of the workpiece is ablated, wherein the radiation produced by plasma during the process in a work area and/or reflected laser radiation is detected and a signal is generated depending on the detected plasma and/or laser radiation, wherein the position of the laser beam in relation to the workpiece and/or an ablation depth is regulated and/or controlled depending on the signal, wherein the process is carried out in a plurality of ablation cycles and an ablation cycle, in particular the last ablation cycle, is repeated or partly repeated depending on the signal so that a correction of the position of the laser beam takes place afterwards in the next ablation cycle in a predetermined contour.

2. Method according to claim 1, wherein material of the workpiece is ablated by the laser beam machining or the workpiece is cut.

3. Method according to claim 1 wherein depending on the signal, the position of the laser beam is altered in relation to the workpiece perpendicular to a scanning direction.

4. Method according to claim 1, wherein the radiation is detected by at least one detector comprising an optoelectronic and/or spectroscopic and/or pyroelectronic element.

5. Method according to claim 1, wherein an axis of an observation radiation path in the work area forms an angle with an axis of the laser beam.

6. Method according to claim 1, wherein the laser beam machining is carried out as remote cutting.

7. Method according to claim 1, wherein the workpiece is indirectly or directly hot formed and optionally press-hardened before the laser beam machining.

8. Method according to claim 1, wherein the workpiece consists of steel, preferably of a manganese-boron steel.

9. Method according to claim 1, wherein the method is used for machining vehicle body parts, such as A, B, C or D pillars, crashboxes, tunnels or longitudinal members.

* * * * *